Figure 1:
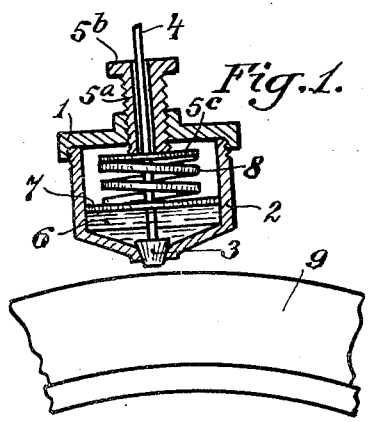

Sept. 29, 1931.   F. FUCHS   1,824,815
METHOD OF AND MEANS FOR PREVENTING THE SLIDING OR SKIDDING OF VEHICLES
Filed Jan. 4, 1930

INVENTOR
FRITZ FUCHS
BY Richards, Geier
ATTORNEYS

Patented Sept. 29, 1931

1,824,815

UNITED STATES PATENT OFFICE

FRITZ FUCHS, OF VIENNA, AUSTRIA

METHOD OF AND MEANS FOR PREVENTING THE SLIDING OR SKIDDING OF VEHICLES

Application filed January 4, 1930, Serial No. 418,528, and in Austria January 14, 1929.

This invention relates to an improved method of and means for preventing the sliding or skidding of vehicles.

The drive of mechanically driven vehicles running on rails, particularly in the event of tramcars, spreads sand onto the rails in order to prevent the sliding or skidding on a slippery track. In the event of motor vehicles which do not run on rails, for instance motor-cars, the above method is not applicable and will also fail in the case of railways, because the rails rest above ground.

According to the present invention the sliding, skidding or slinging of motor vehicles on slippery track is prevented positively and in a most economical manner, whereby the danger of travelling round curves is obviated or diminished and the length of the braking action on a smooth road is reduced and further the climbing of hills is facilitated.

The essential feature of the method according to the present invention consists in applying a sufficiently adhering or sticking and friction-promoting substance, for instance a mixture of a solution of an adhesive substance and sand, to the running face of the wheel, for instance a rubber tyre.
This is preferably carried out in such a manner and at such a place of the running face of the wheel that the slinging off of the mass by centrifugal force is prevented as far as possible.

For this object for instance a mixture of sand and solution of glue, remaining in the liquid state, or any other sufficiently adhering or sticking substance, for instance a syrupy solution, vegetable gum or resinous solutions, may be employed. However instead of applying the substance in the shape of a mixture, the sand and the sticky mass may be applied separately to the rim of the wheel. The frictional material, for instance sand, may be dispensed with if the sticky substance alone sufficiently adheres to the wheels and the surface of the road. However this is not satisfactory in many cases.

The device for carrying out the method according to the present invention comprises a receptacle for the mass provided with a discharge opening, and means for closing the latter. The mass contained in the receptacle may be forced out of the opening, which preferably is closed by a valve, by overpressure for instance air pressure and thus applied to the running face of the wheel. If desired the mass may be subjected to continuous pressure, for instance spring- or air pressure, and is discharged when opening a valve. The device is operated, preferably from the driver's place, by means of compressed air or gas, electric power transmission or any other convenient mechanical appliance. The receptacles may be arranged at one place of the periphery of the wheel, or a large receptacle may be disposed at another place of the vehicle and the mass may pass from said receptacle by means of a piping to the wheel. The mass is discharged from the receptacle in such a manner that it is taken up by the rotating wheel and is not thrown off by the centrifugal force of the wheel.

Figure 2:
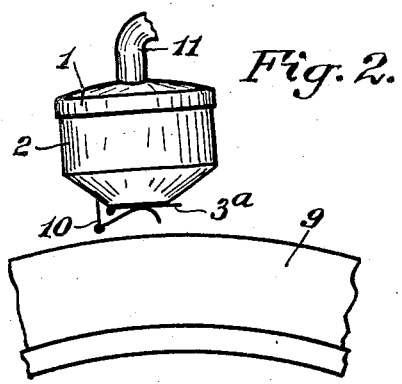
Figure 3:
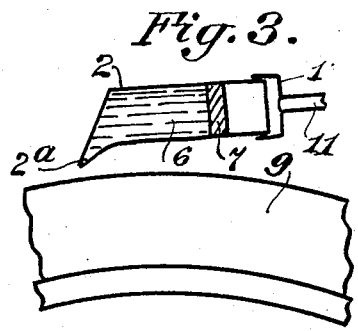

Three modes of carrying out the present invention are illustrated diagrammatically and by way of example in Figs. 1, 2 and 3 of the accompanying sheet of drawings.

The device for applying the means preventing the sliding or skidding of a vehicle consists of a receptacle 2, closed by a lid 1 and provided with a valve seat in its floor, on which is adapted to rest a conical valve 3. The stem 4 of the latter freely passes through a tubular adjusting screw 4, screwed into the neck of the lid 1. The adjusting screw consists of a screw-threaded neck portion $5^a$, an operating knob $5^b$ fixed thereto and a pressure disc $5^c$, which is attached freely rotatable to the bottom end of said neck-portion 5ᵃ. A piston or plate 7 rests on the sticking and friction-promoting substance 6 contained in the receptacle 2 and is subjected to the action of a compression spring 8, which is enclosed between the pressure disc 5ᶜ and the piston 7. The valve-stem 4 passes through and secures the piston 7 in its central position. If it is desired to apply the sticking and friction-promoting substance for instance to the tyre of a motor vehicle, the valve 3 is lifted from the driver's seat either in mechanical, pneumatic, electric, hydraulic or other suitable manner whereby the substance 6, which is continuously subjected to pressure by the spring-loaded piston 7, passes through the valve-seat and is applied to the tyre 9. The tension of the compression spring 8 is adjustable by means of the set-screw 5ᵃ, 5ᵇ, 5ᶜ.

The device shown in Fig. 2 consists of a receptacle 2, a flap-valve 3ᵃ hinged to the latter and loaded by a spring 10 and shutting the discharge opening of the receptacle, and a lid 1, which is provided with a tubular extension 11 and screwed to said receptacle. If it is desired to apply the sticking and friction-promoting substance, contained in the receptacle 2, to the tyre 9, compressed air is introduced by way of the tubular extension 11 into the receptacle 2 until the valve 3ᵃ is opened against the action of its closing spring 10 and a sufficient quantity of the substance has been applied to the tyre 9.

In the construction shown in Fig. 3, the horizontally arranged receptacle 2 is provided with a mouth-piece 2ᵃ through which is discharged the sticking and friction-promoting substance 6 if the piston 7, operating in the receptacle 2, is moved forward by compressed air, which is introduced by way of the tubular extension 11 or in any other convenient manner. The mouth-piece 2ᵃ of the receptacle 2 is disposed in such a manner that the substance 6 can be applied at a place of the tyre where the tendency of the centrifugal force to throw off the substance is reduced to a minimum.

I claim:

1. Method of preventing the sliding or skidding of vehicles provided with rubber tires which consists in applying under pressure a plastic, adhering and friction-promoting substance to the running face of the rubber tire.

2. Device for preventing the sliding or skidding of vehicles comprising in combination a receptacle provided with a discharge opening and containing an adhering and friction-promoting substance, means for closing said discharge opening attached to the receptacle and means in connection with the latter subjecting said substance to continuous pressure.

3. Device for preventing the sliding or skidding of vehicles comprising in combination a receptacle provided with a discharge opening and containing an adhering and friction-promoting substance, means for closing said discharge opening attached to the receptacle and means in connection with the latter subjecting said substance to pressure in case of opening said discharge opening.

In testimony whereof I affix my signature.

FRITZ FUCHS.